Feb. 1, 1938. J. W. SHERA Re. 20,647

CLOSURE STRUCTURE FOR METALLIC CONTAINERS

Original Filed Feb. 10, 1932

Inventor:
John W. Shera
by Rector, Hibben, Davis & Macaulay
Attys

Reissued Feb. 1, 1938 Re. 20,647

UNITED STATES PATENT OFFICE 20,647

CLOSURE STRUCTURE FOR METALLIC CONTAINERS

John W. Shera, Chicago, Ill., assignor to American Flange & Manufacturing Co. Inc., a corporation of Illinois Original No. 1,997,202, dated April 9, 1935, Serial No. 591,941, February 10, 1932. Application for reissue April 9, 1937, Serial No. 136,028

11 Claims. (Cl. 220—39)

My invention relates generally to metallic containers, such as barrels, drums, and the like, suited particularly (but not exclusively) for the transportation and storage of oil, gasoline, and the like; and it has to do especially with means for sealing the closure structure for the filling and/or discharge openings thereof and for applying identification markings thereto.

The principal object of my invention is to provide novel means adapted to be fixedly interlocked with the closure structure and to which an identification tag (or similar means) may be attached, and which is also adapted to serve as means for applying a seal to the closure structure to prevent unauthorized and undetectable tampering with the closure.

More specific objects and advantages will become apparent as this description progresses and by reference to the accompanying drawing wherein.

Figure 1:
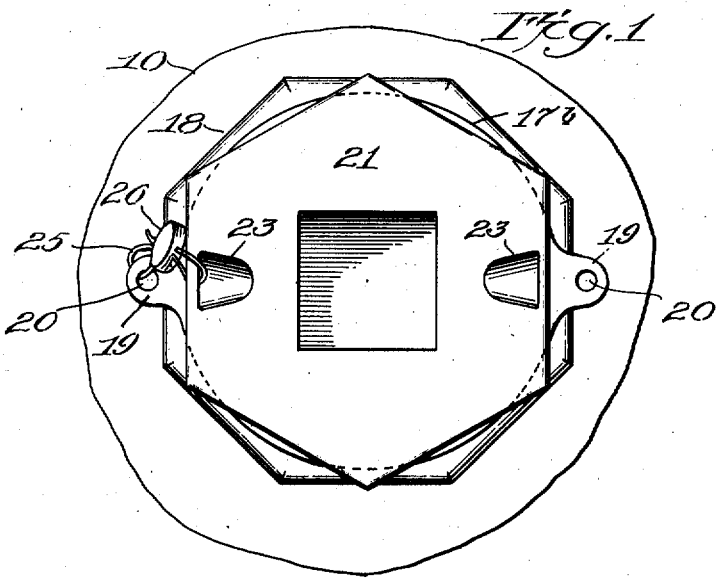
Figure 1 is a top plan view of one form of closure structure embodying my invention.

In certain instances it is customary to apply tags or similar identification mediums to the containers and the container opening closure structure lends itself well to this purpose. It is also customary in certain instances to close the container opening by means of a plug screwed (or otherwise inserted) therein, and, in such cases, it may be desirable to seal the plug in its closed position to prevent removal and undetectable tampering with the same. My invention contemplates the employment of a member interlockingly engaged with and held in place by the closure structure and which serves both of the foregoing purposes. This double-purpose member is well suited for use in connection with the form of closure shown in the drawing, but it is to be understood that it is not limited particularly to such structure since it is capable of use in various other forms of closure structures where similar mounting and use conditions exist.

Figure 2:
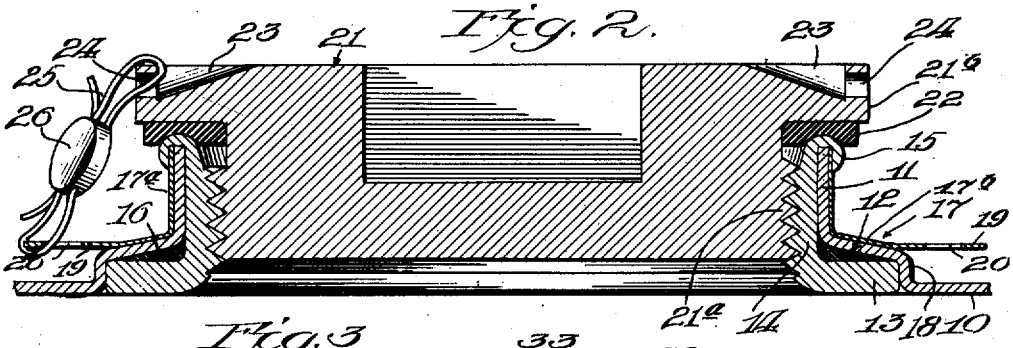
Fig. 2 is an enlarged sectional view of the structure shown in Fig. 1.

Referring particularly to the assembly shown in Figs. 1 and 2, the container wall 10 (which may be a drum head or the like) is provided with a circular opening surrounded by an annular, outwardly projecting flange 11. The wall at the base of the flange 11 and around the container opening is pressed outwardly forming a pocket 12 of noncircular shape in outline and in which is received the lateral and similarly-shaped flange 13 of an internally threaded bushing member 14. The edge of the bushing 14 outwardly beyond its threads is gradually reduced in thickness and it is turned over and upon the outer edge of the flange 11 securing the bushing firmly within the flange and providing at the outer edge of the flange 11 a bead 15. Leakage past the joint between the bushing 14 and the container wall 10 is positively prevented by a gasket or suitable sealing compound indicated at 16.

Figure 4:
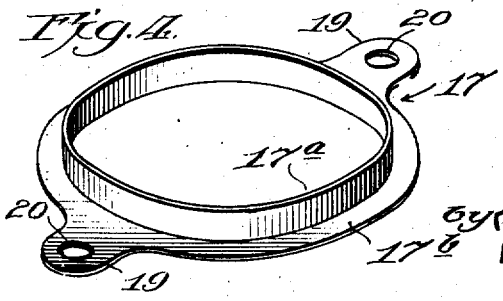
Fig. 4 is a detached perspective view of the tag and seal ring shown in Figs. 2 and 3.

For seal and tag-attachment purposes I employ a ring 17 which takes, preferably, the shape shown in Fig. 4. This ring is formed, preferably, of thin and readily deformable sheet metal and is provided with an upstanding cylindrical rim $17^a$ and a horizontal bottom flange $17^b$. The cylindrical portion $17^a$ of this ring is of a diameter permitting the same to be fitted rather snugly down over the wall flange 11, and its bottom flange $17^b$ is of sufficient width to seat upon the pocket forming boss 18 around the container at the base of the container flange 11. In the assembly of the structure, the ring 17 is first mounted over the flange 11 so that, when the outer edge of the bushing 14 is then turned over and upon the outer edge of the flange 11, it is likewise turned over and upon the upper edge of the ring part 17b, thereby rigidly fixing the ring 17 upon the flange 11 against rotation and against displacement from the flange by movement in any direction.

The bottom flange $17^b$ of the ring 17 is provided with at least two outwardly projected ears 19 which are, preferably, diametrically opposed. Each of these ears is provided with an opening 20 through which a wire or cord attached to a tag may readily be passed for securement. In this manner a durable and inconspicuous, but highly efficient, tag-attachment means is provided.

In the use of this ring 17 for seal purposes, the container opening may be closed by a plug such as indicated at 21 (Figs. 1 and 2) which plug has a threaded body $21^a$ engageable with the threads of the bushing 14 and a laterally extending and enlarged head $21^b$ which projects out over and above the bead 15. In applying the plug 21 for closure purposes, a gasket 22 is interposed between the head $21^b$ and the bead 15 for effecting a sealed joint at that point. The upper surface of the plug head is provided with a pair of opposed V-shaped recesses 23 which are located in the close proximity to the periphery of the plug head, and the plug head is provided with peripheral openings 24 which lead into the pockets 23. The plug may be screwed into the bushing sufficiently to effect the proper closure-seal and to approximately align the pockets 23 with the openings 20 in the ring 17. To prevent undetectable removal and tampering with the plug 21, a sealing wire 25 is passed through one of the ring openings 20 and the adjacent of the plug openings 24 and a seal device 26 is applied across the free ends of the wire and the adjacent body portion thereof as clearly shown in Fig. 2. In applying the seal device, the wire may be drawn sufficiently taut to prevent turning movement of the plug (sufficiently to break the plug seal) without breaking of the wire 25 and/or seal 26.

Figure 3:
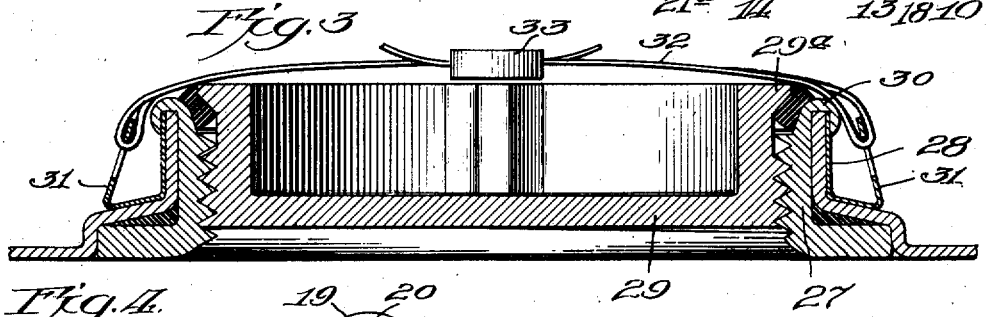
Fig. 3 is a section similar to that of Fig. 2 showing another application of my invention.

In Fig. 3 I show another form of plug assembly, in connection with which the ring 17 has utility. More particularly, the bushing 27 and ring 28 (of the same form as the ring 17) are assembled in the same manner above described in connection with the form of Fig. 2. The externally threaded plug 29 is provided with a head 29a which does not project out over the bushing bead 30, wherefore it does not lend itself to attachment to the ring 28 by passing a wire therethrough as in Fig. 2. In this form, the plug 29 may be screwed inwardly to such an extent that the top of its head is approximately at the height of the bead 30; and, in this case, I, preferably, bend the ring ears 31 into an upright condition (Fig. 3) and pass a wire 32 through the openings in the oppositely-positioned ring ears and across the top of the plug 29. I then apply a seal device 33 to the free ends of the wire 32 in the same manner as described in connection with the seal of Fig. 2, and the wire 32 is drawn sufficiently taut that the plug 29 cannot be removed without breaking the wire seal.

In both of the foregoing forms, the ring 17 (or 28) is held against rotation, eliminating the possibility of rotating the ring member with the plug for removal or loosening of the latter. This particular seal arrangement also tends to prevent loosening of the plug sufficiently for leakage due to temperature conditions, strains and stresses imposed on the container enclosure during transportation, handling, and storage. It will also be obvious from the foregoing that my invention provides a very simple and inexpensive, yet highly dependable, means for the application of tags to the closure structure as well as for sealing the container closure. In some cases, closure structure such as disclosed in my copending application, Serial No. 573,675, may be employed. The ring 17 may be equally well applied to that form of closure and well serve the convenience of the user after the original seal has been broken. In other words, in the event that a seal cap is initially fixed over the closure of the form of Fig. 3, when that seal cap is removed, the user may readily seal the container again, using the original plug, in the manner shown in Fig. 3. Or, if he so desires, he may substitute a plug of the form shown in Fig. 2 and readily seal the same. In some cases a plug may be used which is similar to that of Fig. 2, except that the head has a greater overhang and is provided with an opening extending axially therethrough near the outer edge of said head. It will be obvious that such a plug may be sealed in the manner taught in Fig. 2.

While I have referred to several applications of my invention, it will be understood that other arrangements and changes in detail parts may be made without departing from the spirit and scope of my invention as defined by the claims which follow.

I claim:

1. In structure of the class described, a wall having an opening therein, a flange projecting from said wall and surrounding said opening, a ring member having a body portion embracing the outer surface of said flange and an angularly disposed and laterally extending rim portion having an attachment extension projecting therefrom, and means applied independently of said flange and located on the outer end of said flange for securing said ring member thereto against movement bodily in any direction.

2. In structure of the class described, means forming an opening in the wall of the container, said means including a flange projecting from the container wall and a bushing member supported by said flange and having one end beaded over the outer edge of said flange to secure the bushing member to said flange, a ring member mounted upon the exterior part of said flange and fixedly secured in position by the beaded edge of said bushing end, a plug member insertable in said bushing, and means for interconnecting said plug and ring member.

3. In structure of the class described, means forming an opening in the wall of the container, said means including a flange projecting outwardly from the container wall and a bushing member supported by said flange and beaded over the outer edge of the latter to fix said bushing and flange together, and a ring member having one part mounted upon said flange and fixed in place by the beaded portion of said bushing member and another part projected laterally from said flange and seated upon the container wall at the base of said flange, said latter mentioned part having an attachment extension.

4. In structure of the class described, a container wall having an opening therein, an annular flange surrounding said opening and projecting away from said container wall, a bushing mounted within said flange and having its outer end turned over and upon the outer end of said flange, and a ring member having an annular body portion fitted around said flange with its upper edge fixedly confined between said flange and bushing by said turned-over end of said bushing, said ring member also having a laterally extending base portion seated upon the container wall around said flange and having one or more defined perforated extensions.

5. In structure of the class described, a wall having a circular opening therein, a flange projecting away from said wall a substantial distance and surrounding said opening, a relatively thin metallic ring member having a base portion of substantial width seated upon the container wall at the bottom of said flange and an upstanding body portion fitting exteriorly upon said flange, and a bushing member reinforcing said flange and engaged with said ring member securing said ring member upon said flange against displacement by movement in any direction, said base portion having one or more extensions with an opening therein for the reception of a wire, cord or the like.

6. In structure of the class described, the combination with means, including an outwardly extending, cylindrical flange, forming an opening in the wall of the container, and a plug for closing said opening, said plug having a head which does not project laterally beyond the edge of said opening; of a seal ring mounted exteriorly upon said flange, means separately applied to said flange and extending over the outer end of said flange into engagement with said seal ring for fixing the latter against movement relative to said flange, said ring having deformable extensions substantially diametrically opposed to each other and having openings therein, and a seal wire adapted to be passed through said openings in opposed extensions and entirely across the head of said plug for reception of seal means seal-fastening its free ends.

7. In structure of the class described, the combination with means, including an outwardly extending, cylindrical flange and an internally threaded bushing surrounded thereby, forming an opening in the wall of the container, and a plug adapted to be screwed into said bushing for closing said opening, said plug having an opening therein near the periphery of its head portion; of a seal ring mounted exteriorly upon said flange, said bushing being adapted to be turned over and upon the outer edge of said flange for fixing said ring against movement relative to said flange in any direction, said ring having one or more lateral and perforated extensions, one of which extensions is adapted to align with the opening in said plug head portion, and a seal wire adapted to be passed through the perforation in said ring extension and through the opening in said plug head portion for reception of seal means for seal fastening of its free ends.

8. In structure of the class described, a wall having an opening therein, a flange projecting from said wall and surrounding said opening, a ring member having an upwardly extending body portion and an angularly disposed and laterally extending rim portion embracing the outer surface of said flange and having an attachment extension projecting therefrom and means applied independently of said flange and located on the outer end of said flange for securing said ring member thereto against movement bodily in any direction.

9. In structure of the class described, a wall having an opening therein, an outwardly extending embossing in said wall surrounding said opening, a bushing extending outwardly through said opening having one of its ends flanged laterally and at its other end having a laterally extending flange received in said embossing, there being interengaging means on said last named flange and said embossing for preventing rotation of said bushing, a ring member having a skirt portion engaging the upper face of said embossing and having an upwardly extending collar portion, the upper end of said collar portion being engaged by the first named laterally flanged end of said bushing to hold said ring member in place.

10. In structure of the class described, a wall having an opening therein, said wall being outwardly bulged around said opening, a ring member having an upwardly extending body portion and an angularly disposed and laterally extending rim portion embracing the outer surface of said bulged portion of the wall and projecting beyond said bulged portion to provide seal receiving means and a member extending through said opening and having its upper end flanged laterally and curved downwardly for engaging the upper end of said ring member to retain said ring member in place and having its lower end flanged laterally to be non-rotatably engaged in the bulged portion of said wall.

11. In structure of the class described, a wall having an opening therein, a portion of said wall adjacent said opening being upwardly offset, a bushing member extending through said opening and having a laterally extending flange formed to seat inside of the offset portion of said wall and engage therewith to prevent rotation of said bushing, and a ring member having a collar portion extending upwardly substantially parallel to said bushing and having a laterally extending skirt portion engaging the outer surface of said offset wall portion, said bushing having its outer extremity beaded over to engage said collar portion.

JOHN W. SHERA.